United States Patent

Birrell

Patent Number: 5,825,019
Date of Patent: Oct. 20, 1998

[54] TIMING DEVICE CAPABLE OF SYNCHRONIZING INITIATION TIME

[75] Inventor: Peter C. Birrell, Darlinghurst, Australia

[73] Assignee: H.P.M. Industries Pty Limited, Australia

[21] Appl. No.: 728,840

[22] Filed: Oct. 10, 1996

[51] Int. Cl.⁶ .................................................. H01J 40/14
[52] U.S. Cl. ............................ 250/214 AL; 250/214 LS
[58] Field of Search .................... 250/214 AL, 214 L, 250/214 LS, 214 B, 214 C; 315/159, 156, 158

[56] References Cited

U.S. PATENT DOCUMENTS

| | | | |
|---|---|---|---|
| 4,198,563 | 4/1980 | Elssner | 250/214 AL |
| 4,237,377 | 12/1980 | Sansum | 250/214 AL |
| 5,180,907 | 1/1993 | Udden et al. | 250/214 B |

*Primary Examiner*—Que Le
*Attorney, Agent, or Firm*—Ladas & Parry

[57] ABSTRACT

A timing device which is associated with a light level sensor and which is arranged to provide a time-out signal to a relay after a predetermined time has elapsed following detection of a low light condition and initial energization of the relay. The device provides for synchronization of an initiation time $T_1$ and, hence, a time-out signal generating time $T_2$ with respect to a periodically occurring event time $T_3$ (for example, sunset time) in order that the desired time of generating the time-out signal might be re-established following interruption of power to the device. Should loss of power occur, the last entered event time $T_3$ is employed to synchronize the initiation time $T_1$ and, hence, the signal generating time $T_2$, when detection of a predetermined light level next occurs following re-establishment of power to the device.

11 Claims, 2 Drawing Sheets

TIMING DEVICE CAPABLE OF SYNCHRONIZING INITIATION TIME

FIELD OF THE INVENTION

This invention relates to a timing device which is associated with a photoelectric transducer and which is arranged to be synchronized with reference to a predetermined lighting condition that is sensed by the transducer.

BACKGROUND OF THE INVENTION

Photoelectric transducers are conventionally employed in light level sensors which are used for detecting the level of ambient light and for controlling the switching of electrical circuits with changes in ambient light levels. In some applications it is required that switch-on should occur when the ambient light falls below a predetermined level (for example at sunset) and that switch-off should occur at a time which precedes the following sunrise. This requirement is conventionally met by locating a timer in circuit with the light level sensor and by setting the timer to effect switch-off at a particular local time. However, a timer requires sustained power or battery back-up in order that it might function in a predictable manner and, thus, provide for consistent switch-off operations. Alternatively, vigilance must be maintained and the timer must promptly be reset following power failures, again in the interest of avoiding erratic switch-off timing.

The present invention is directed to a timing device which is synchronized by reference to a predetermined lighting condition and which avoids at least some of the problems associated with conventional light level sensor-timer devices.

SUMMARY OF THE INVENTION

The present invention provides a timing device for use in conjunction with a light level sensor and which comprises:
  (a) means providing a clock function and providing for the establishment of an initiation time $T_1$,
  (b) means for entering and storing a signal generating time $T_2$ at which a time-out signal is to be generated, where $T_2=T_1+t_1$ and $t_1$ is a predetermined time interval,
  (c) means for generating the time-out signal on expiration of the time interval $t_1$ following successively occurring times $T_1$, and
  (d) means for entering and storing a periodically occurring event time $T_3$ responsive to a predetermined light level being detected by the light level sensor and for effecting synchronization of the initiation time $T_1$ with respect to the last entered event time $T_3$ upon detection of the predetermined light level.

In operation of the device, should loss of power occur, the last entered time $T_3$ is employed to synchronize the initiation time $T_1$ when detection of the predetermined light level next occurs following re-establishment of power to the device.

The invention may alternatively be defined in terms of a method of generating the time-out signal at a selected signal generating time $T_2$ and which comprises the steps of:
  (a) establishing a clock function and an initiation time $T_1$,
  (b) entering and storing the signal generating time $T_2$ at which the time-out signal is to be generated,
  (c) entering and storing a periodically occurring event time $T_3$ at which a predetermined light level is detected by a light level sensor, and
  (d) employing the last entered time $T_3$ to synchronize the initiation time $T_1$ with respect to the event time $T_3$ upon detection periodically of the predetermined light level so that, should power be lost by and subsequently be re-established to the timing device, the device will continue to provide the time-out signal at the originally selected time.

As will be apparent from the above definitions of the invention, the timing device is arranged to be "self-adjusting". Thus, in the event of loss and subsequent re-establishment of power, the device will continue to provide a time-out signal at the originally selected time $T_2$, provided only that the predetermined light level is detected at event time $T_3$ to act as the trigger for synchronization of the device after power is restored.

The predetermined light level might be detected as the result of sunrise or sunset or from a remote artificially created light condition. That is, the event time $T_3=T_1+t_2$ may be selected such that the time interval $t_2$ is less than or greater than the predetermined time interval $t_1$. However, the time interval $t_2$ preferably is selected to be shorter than the interval $t_1$.

Appropriate controls such as operating condition checks and response delays may be incorporated in the device in order that discrimination might be provided against transient false indications of the predetermined light condition.

The invention will be more fully understood from the following description of a preferred embodiment of a light level sensor for use in controlled switching of artificial lighting under low light conditions and for use in limiting the period of time during which the lighting is sustained under the low light conditions. The description is provided with reference to the accompanying drawings.

DETAILED DESCRIPTION OF THE INVENTION

Figure 1:
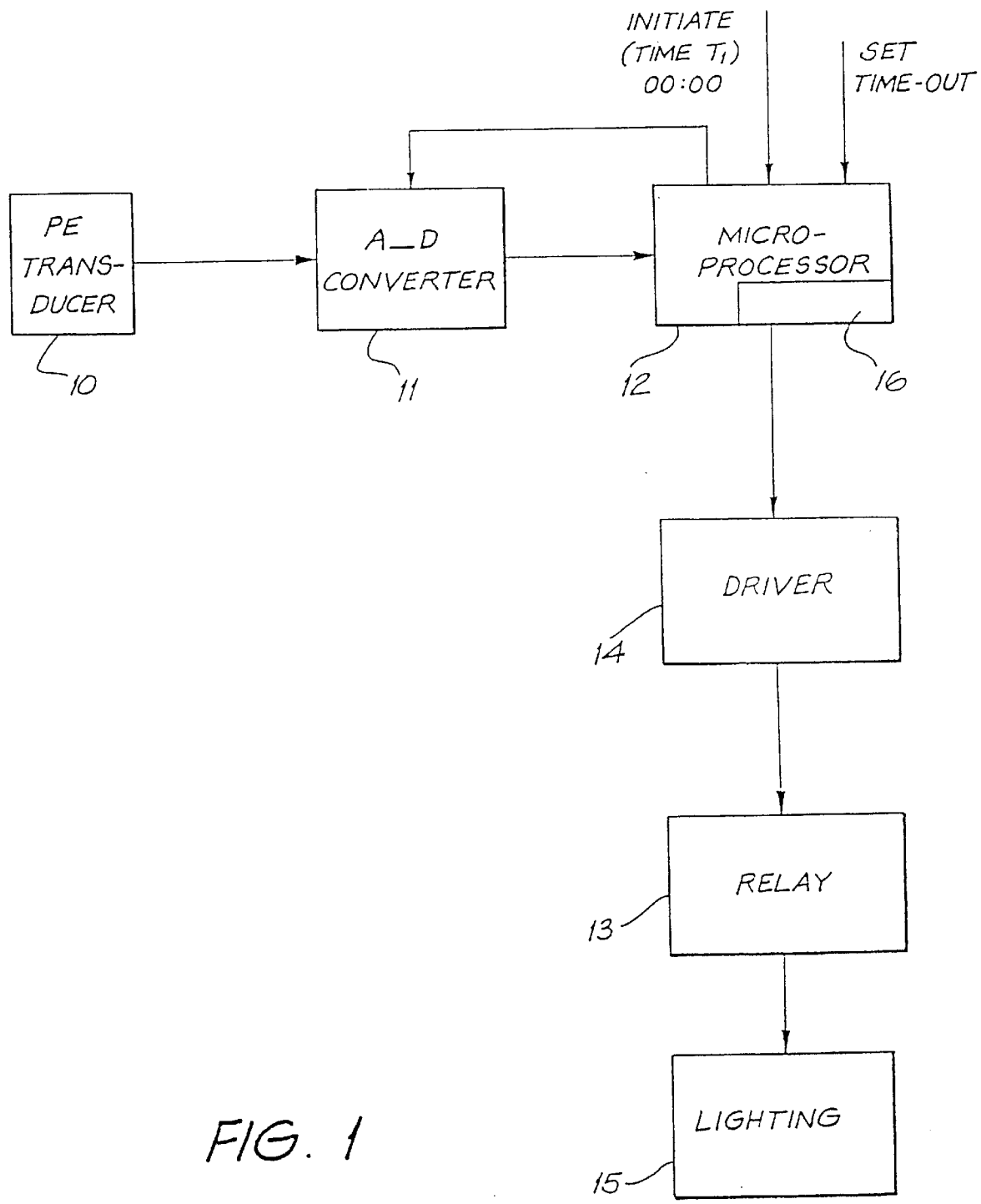
FIG. 1 is a block diagrammatic representation of the sensor and a relay which is controlled (i.e., energized or de-energized) by the sensor.

As illustrated in FIG. 1, the light sensor comprises a photoelectric transducer 10, typically in the form of a phototransistor. The level (or average level) of the output signal from the transducer 10 will be significant of the level of incident light, whatever may be the source of the light, and the output signal is applied to an analogue-to-digital converter 11 which functions to sample and digitize the transducer output signal under the control of a following microprocessor 12. The output from the analogue-to-digital converter 11 is fed to the microprocessor 12 and a determination is made as to the average value of the difference between quantized high and low levels of the transducer output signal. This provides a periodic measure of the level of light falling incident on the transducer 10 and is compared with a reference value for the purpose of producing a HIGH light indication or a LOW light indication. A LOW light indication is used to generate a signal which is applied to a relay 13, by way of a driver stage 14, to effect energizing of the relay and consequential switching of artificial lighting 15.

Having energized the lighting 15 as a consequence of the detection of a LOW light condition, the microprocessor 12 provides a time-out function for the purpose of de-energizing the relay 13 and switching-off the lighting during the period of the LOW light condition and prior to an event that establishes a HIGH light condition. To this end the microprocessor incorporates an integral timing device or network which is indicated diagrammatically as being contained within block 16 in the microprocessor. The timing device 16 includes a 24-hour clock counter which normally would be initiated during installation of the complete system and into which a time-out code might be inserted at the same time. Thus, the clock counter might be initiated to time $T_1$ of 00:00 corresponding to local installation time of 16:00 hours and the time-out code might be entered and stored as $t_1$=08:00 to effect time-out at local time (16:00+08:00=) 24:00 hours, corresponding to time $T_2$=00:00+08:00.

In the absence of the features of the present invention, if power to the system was to fail for a period of, say, two hours, future time-out signals might be generated at local time 02:00 hours (or at a time that varies with the time of sunset, depending upon the functional characteristics of the device) rather than at the required local time of 24:00 hours. However, the present invention provides effectively for re-establishment of the original condition by synchronizing the initiation time $T_1$ with an event time $T_3$, when detecting a LOW light (e.g., sunset) condition, and resetting the $T_1$-to-$T_3$ relationship when the LOW light condition occurs next following loss and re-establishment of power. The re-establishment of this relationship will involve a slight time shift, due to the daily difference in sunset time, but it is thought that the shift will be accommodated by users of the system. Alternatively, the device may be programmed to compensate for sunset time shifts during successive 24-hour periods.

The means for providing a clock function and setting the initiation time $T_1$ the means for generating a time-out signal and means for effecting synchronization are implemented in the microprocessor portion 12, while the respective means for entering and storing a signal time and event time are embodied in the timing device 16 portion of the microprocessor. The above described operations are program controlled in the microprocessor/timing device 12/16 and the various process control functions, plus supplementary functions, are indicated diagrammatically in the flow diagram shown in FIG. 2.

Figure 2:
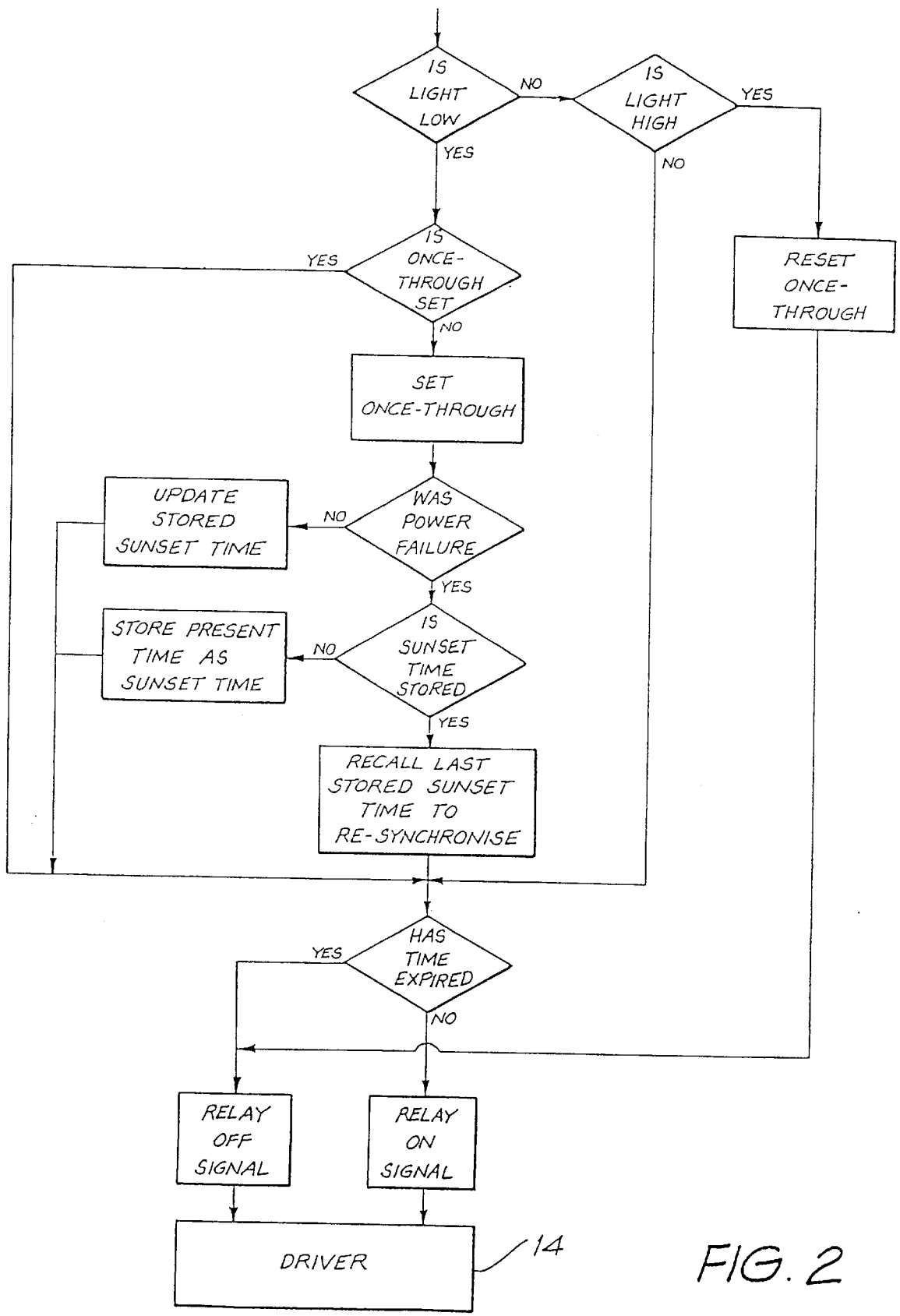
FIG. 2 shows a flow diagram of process control functions performed in the sensor.

As indicated in FIG. 2 an input (which comprises a processed form of the output from the analogue-to-digital converter 11) is applied to the processing/timing stage in the microprocessor 12 at periodic intervals, typically once per minute but in any case at intervals which are short relative to the time interval $t_1$. If the input tests HIGH a ONCE THROUGH function is reset and a relay-off signal is applied to the driver stage 14 for the purpose of de-energizing the relay. If the input tests not-HIGH an enquiry is executed to determine if the time-out time $T_2$ has expired and if it has not a relay-on signal is applied to the driver 14 so that the relay 13 is maintained in an energized state and lighting is maintained. If on making the enquiry it is determined that the time-out time $T_2$ has expired a relay-off signal is applied to the driver stage 14.

As a parallel program function, if the ambient light tests LOW a test is made to determine whether the ONCE THROUGH program function is set. If this enquiry is determined in the affirmative, an enquiry is again made as to whether the time-out time $T_2$ has expired. If it has, a relay-off signal is applied to the driver stage 14, and if it has not a relay-on signal is applied to the driver stage 14.

If the ONCE THROUGH enquiry is answered in the negative, the ONCE THROUGH program control is set and an enquiry is made as to whether a power failure to the complete system has been recorded. If this enquiry is answered in the negative, the stored sunset time $T_3$ is updated as the current sunset time, and the further program functions as above described proceed toward applying commands to the relay driver 14, In the event that the power failure recordal enquiry is answered in the affirmative, a further enquiry is made as to whether a sunset time $T_3$ is stored. If it is not, program-controlled storage of the currently occurring sunset time $T_3$ is stored.

If the enquiry as to whether a sunset time $T_3$ is stored is answered in the affirmative, the last stored sunset time $T_3$ is recalled to establish synchronization between the time $T_3$ and the initiation time $T_1$. Thus, if $T_1$ is initiated as 00:00 hours (corresponding to 16:00 hours local time) and $T_3$ is recalled as 02:00 hours (being the last stored sunset time, corresponding to 18:00 hours local time), synchronization is established such that $T_1$ occurs two hours prior to $T_3$ (at 16:00 hours local time) and $T_2$ is then established arithmetically as being 08:00 hours, corresponding to 24:00 hours local time.

From the above description it will be seen that, by establishing an initiation time $T_1$ of 00:00 hours (whatever the local time may be) and by storing time-out and sunset times $T_2$ (=$T_1$+$t_1$) and $T_3$ (=$T_1$+$t_2$) with reference to the initiation time $T_1$, synchronization may be effected at any time by preserving the daily-modified relationship between $T_1$ and $T_3$, so that the time-out $T_2$ will be preserved with reference to the original initiation time $T_1$.

The system in accordance with the present invention accommodates seasonal changes and provides for re-establishment of initial conditions without there being a need for a local time clock. As $T_3$ shifts between summer and winter (i.e., as the time interval $t_2$ varies), daily updating of the sunset time (i.e. the LOW light condition) $T_3$ will enable $T_1$ to be recalled with reasonable accuracy, (following re-establishment of power) with reference to the next occurring low light input signal to the timing device at any time during the course of a year.

Variations and modifications may be made in the process steps (and the underlying algorithm) represented in the flow diagram of FIG. 2. The essence of the invention resides in the synchronization of the initiation time $T_1$ (and, as a consequence, synchronization of the time-out signal generating time $T_2$) with reference to periodically occurring event time $T_3$ (typically the time of sunset) as detected by the device itself.

The various process steps shown in the flow diagram of FIG. 2 may be implemented in any microprocessor having elements that are arranged to perform the process steps under program control. Such a microprocessor is well known in the art and program control may be implemented using techniques that are well understood in the art.

I claim:

1. An electronic timing device for use in connection with a light level sensor and which comprises means for providing a clock function and for setting an initiation time $T_1$ upon initial implementation of the device, means for entering and storing a signal time $T_2$ for generating a time-out signal, where $T_2$=$T_1$+$t_1$ and $t_1$ is a predetermined time interval, means for generating the time-out signal at the signal time $T_2$ on expiration of the predetermined time interval $t_1$ following the initiation time $T_1$ in successive 24-hour periods of time, means for entering and storing an event time $T_3$ for a periodically occurring event responsive to a predetermined light level being detected by the light level sensor, and means for synchronizing the initiation time $T_1$ with respect to the entered event time $T_3$ upon detection of the predetermined light level.

2. The timing device as claimed in claim 1 wherein the means for providing a clock function and setting an initiation time, the means for entering and storing a signal time $T_2$, the means for generating a time-out signal, the means for entering and storing an event time $T_3$ and the means for synchronizing the initiation time $T_1$ and the event $T_3$ are embodied, respectively, within a microprocessor.

3. The timing device as claimed in claim 2 wherein the device is integrated with the light level sensor and the light level sensor incorporates a photoelectric transducer.

4. The timing device as claimed in claim 3 wherein an output from the light level sensor is digitized and processed by the microprocessor at periodic intervals which are short relative to the predetermined time interval $t_1$.

5. The timing device as claimed in claim 2 wherein the output from the microprocessor is applied by way of a driver circuit to a relay which is arranged to switch power to a lighting circuit.

6. A method for generating a time-out signal in an electronic timing device which is used in conjunction with a light level sensor, wherein the time-out signal is generated at a selected signal time $T_2$ and wherein the method comprises the step of implementing a clock function and setting an initiation time $T_1$ upon the implementation of the timing device, entering and storing the selected signal time $T_2$, where $T_2=T_1+t_1$ and $t_1$ is a predetermined time interval, generating the time-out signal at the signal time $T_2$ on expiration of the predetermined time interval $t_1$ following the initiation time $T_1$ in successive 24-hour periods of time, entering and storing an event time $T_3$ for a periodically occurring event at which a predetermined light level is detected by the light level sensor, and employing the entered event time $T_3$ to synchronize the initiation time $T_1$ with respect to the event time $T_3$ upon detection of the predetermined light level.

7. The method as claimed in claim 6 wherein synchronization of the initiation time $T_1$ with respect to the event time $T_3$ is effected upon detection of the predetermined light level following loss of and subsequent re-establishment of power to the timing device incorporating the light level sensor.

8. The method as claimed in claim 6 or claim 7 wherein the periodically occurring event time $T_3$ is entered and stored upon detection of a LOW light condition.

9. The method as claimed in claim 8 wherein the periodically occurring event time $T_3$ is entered and stored upon the detection of a LOW light condition which is established as a consequence of sunset.

10. The method as claimed in claim 6 wherein the event time $T_3$ is established as $T_3=T_1+t_2$, where $t_2$ is a time interval shorter than the predetermined time interval $t_1$.

11. The method as claimed in claim 6 wherein a test is made at periodic testing intervals for the existence of the predetermined light level and wherein each testing interval period is short relative to the predetermined time interval $t_1$.

\* \* \* \* \*